Aug. 12, 1924.  
C. L. RUFFCORN  
PULLEY PIN  
Filed Aug. 30, 1921  
1,504,905

Inventor  
Clarence L. Ruffcorn,  
By  
Attorney

Patented Aug. 12, 1924.

1,504,905

UNITED STATES PATENT OFFICE.

CLARENCE L. RUFFCORN, OF OMAHA, NEBRASKA, ASSIGNOR OF ONE-HALF TO TONY COSTANZO, OF OMAHA, NEBRASKA.

PULLEY PIN.

Application filed August 30, 1921. Serial No. 496,855.

*To all whom it may concern:*

Be it known that I, CLARENCE L. RUFFCORN, a citizen of the United States, residing at Omaha, in the county of Douglas and State of Nebraska, have invented new and useful Improvements in Pulley Pins, of which the following is a specification.

This invention relates to pulley pins and particularly to that type of pulley pin which is used to secure the lower fan pulley to the crank shaft in the construction present in the Ford automobile, in which the fan pulley is peripherally flanged and has an inwardly extending hub mounted on the crank shaft of the engine by means of a pin loosely passing through aligned openings in the hub and crank shaft. Access to the interior of the pulley for the insertion of the pin is provided by a circular hole in the flange of the pulley through which the pin is slipped radially, and into the aligned aperture in the hub and crank shaft. The pin is ordinarily of such length that when the lower end of said pin abuts against that part of the flange opposite the apertured portion, the other end of the pin terminates a slight distance inwardly from the peripheral flange. This end of the pin in the well known embodiment, is transversely bored for the reception of a cotter pin which projects laterally from both sides of said bore affording a stop to prevent said pin from slipping out through the hole in the flange during the normal operation of the fan pulley.

The pin performs another function than that of securing the fan pulley to the shaft, constituting an actuated means with which the dog of the hand crank engages when it is desired to rotate the crank shaft manually to start the engine. Said hand crank is so mounted relative to the fan pulley that the dog portion thereof faces the open side of said pulley and occupies most of the space immediately in front of said pulley so the cotter key is very difficult of approach from this direction. The close presence of the radiator of the automobile also renders it well nigh impossible to place the cotter key within the transverse opening in the securing pin and to properly spread the ends thereof. On this account when it is desired for any reason to replace the cotter key it is usually done in an incomplete, unworkman-like manner and the ends thereof so imperfectly spread that they lie in the path of engagement of the dog of said hand crank being sooner or later shorn or twisted off. The result is that the cotter key comes out and the end of the securing pin finally emerges outwardly of the surface of the pulley flange, first destroying the fan belt and then as it extends still further it collides with the crank pan which lies closely adjacent the lower side of said fan pulley jamming thereagainst and ordinarily bending said pin and raising a bur around the wall of the flange aperture which thereafter works rapid destruction to the succeeding fan belts until the entire fan pulley is replaced.

In order to make the insertion of the securing means for the pulley pin more convenient and so to simplify the proper reinsertion of the same when a replacement job is undertaken, one of the objects of the invention is the provision of a pin in which the securing means is inserted axially in said pin by way of the aperture in the pulley flange through which the pin itself was inserted.

Another object of the invention is to provide for the convenient and ready removal of the pulley pin.

With the above and other objects in view, my invention consists in the improved pulley pin illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1:
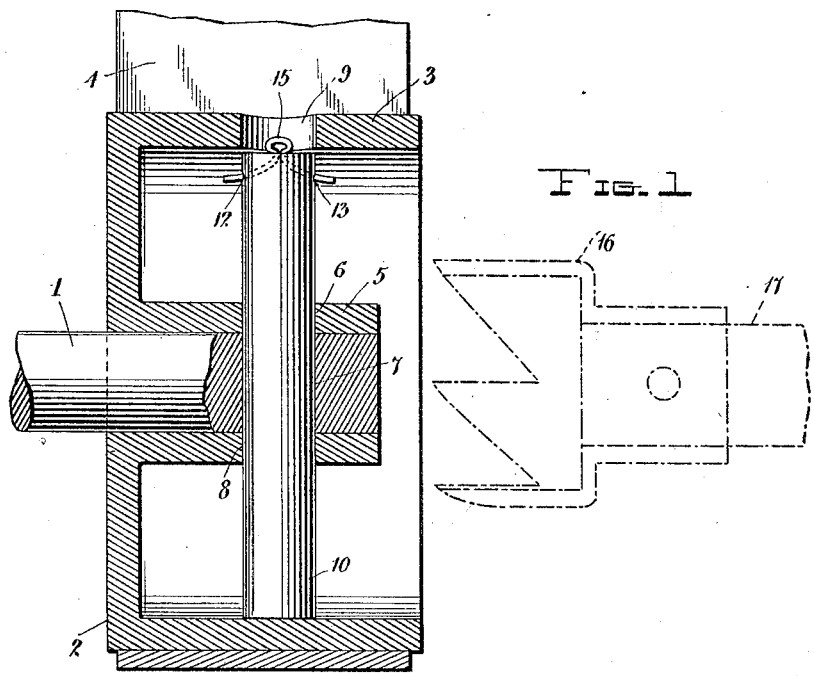
Fig. 1 is a view partly in section showing a fan pulley with my improved pulley pin in position therein.

Referring in detail to the figures the crank shaft of the automobile is represented by the numeral 1 upon the outer end of which is mounted a fan pulley 2 which is provided with a peripheral flange 3 forming a seat for the fan belt 4, and an inwardly directed hub portion 5. The pulley makes a loose fit with the end of the crank shaft which is provided with a transverse aperture 7 therethrough, and at diametrically opposite points the hubbed portion of said pulley is provided with aligned apertures 6 and 8. By shifting the pulley a little to one side or the other the pulley apertures may be brought into alignment with the bore in the crank shaft. The pin 10 is then slipped into place by way of the hole 9 in the flange, said pin having a fairly loose fit in the aligned apertures and the lower end of said pin being in abutment with the imperforate side of the pulley flange 3. The length of said pin is such that the upper end thereof terminates short of the hole 9 in the pulley flange. The pin 10 which constitutes a part of my invention, said invention including also the combination of the pin with the pulley, is provided at its upper end with a substantially axial bore 11 which merges in a pair of inclined bores 12 and 13 leading to the lateral surface of said pin near its upper end, constituting a key-way for the insertion of a cotter key. The apex 14 which is formed by the metal between said inclined bores forms a cam which acts when the cotter key 15 is inserted thereagainst under pressure, to spread the ends of said cotter key so that they follow the inclined bores 12 and 13 and emerge on either side of said pin at a substantial angle to the sides of said pin, extending beyond the walls of the hole 9 so that when the pulley rotates, and the pin falls toward said hole the legs of said cotter key will engage the inner side of the wall of said hole preventing the emergence of the pin beyond the peripheral surface of the pulley flange.

The pin 10 is so constructed that the inclined bores 12 and 13 intersect the sides of said pin at such a distance from the end of the latter that when they engage the inner end of the wall of the hole 9 the end of said pin will still be a slight distance within said aperture. If as shown in Figures 1 and 2 the head of the cotter key projects from the end of the pin 10 in such a way as to possibly extend beyond the peripheral surface of the pulley flange 3 a slight blow struck by a tool inserted within the hole 9 will flatten the head of said cotter key substantially flush with the upper surface of the pin 10.

Figure 2:
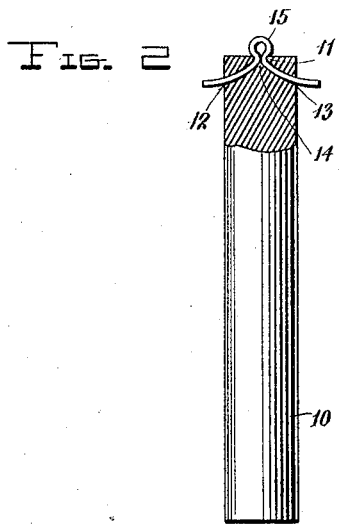
Fig. 2 is a view of the pulley pin the upper portion being in section to show the cam surface formed by the divergent arms of the key-way.
Figure 3:
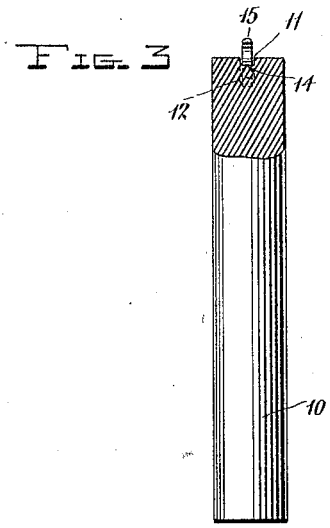
Fig. 3 is a view taken at right angles to the plane of Figure 2 with the top end of the pin shown in section.

The length of my improved pin is such that when it is in the position shown in Figure 1 in abutment with the inner surface of the pulley flange the divergent ends of the cotter pin will be held outside of the zone of engagement of the dog 16 of the hand crank 17 with the pin 10.

Should it be desired at any time to remove the pin from the fan pulley, it is only necessary to insert the ends of the pliers within the hole 9, grasp the head 15 of the cotter key and pull. This will raise the pin until the divergent ends of the cotter key abut against the wall of the aperture 9, which will momentarily arrest the movement of the pin 10. Then said divergent ends will be retracted until they are flush with the surface of said pin after which the pin is readily withdrawn by the pliers, using the head of the cotter key as a handle.

This is quite in contrast with the usual method of removing the ordinary pulley pin which is done by fishing around between the dog of the hand crank and the front of the fan pulley until the cotter key is found and removed and then rotating the crank shaft of the engine until the fan pulley is in inverted position with the aperture 9 in registry with an aperture made for the purpose in the bottom of the crank pan, not shown, when the pin will usually slide through both apertures and drop to the ground.

Having described my invention what I claim as new and desire to secure by Letters Patent, is:—

1. In combination with a shaft and an inwardly hubbed pulley having a peripheral flange, said shaft and the hubbed portion of said pulley being provided with aligned apertures for the reception of a securing pin, and said flange having an opening for the insertion of the pin, a pin insertable through said opening into said hub and shaft apertures, said pin being provided with a bore aligned with said flange opening and securing means for said pin insertable through said flange opening and into said bore, said securing means having lateral portions extending beyond the wall of said flange opening.

2. In combination with a shaft and an inwardly hubbed pulley having a peripheral flange, said shaft and the hubbed portion of said pulley being provided with aligned apertures for the reception of a securing pin, and said flange having an opening for the insertion of the pin, a pin insertable through said flange opening into said hub and shaft apertures, said pin being provided with a bore aligned with said flange opening and securing means for said pin insertable through said flange opening and into said bore, said securing means having lateral portions extending beyond the wall of said flange opening, and said pin provided with a cam surface for laterally diverting said securing means to cause the latter to extend beyond the wall of said flange opening.

3. In combination with a shaft and an inwardly hubbed pulley having a peripheral flange, said shaft and the hubbed portion of said pulley being provided with aligned apertures for the reception of a securing pin and said flange having an aligned opening for the insertion of the pin, a pin insertable through said flange opening into said hub and shaft apertures, said pin being provided with a bore in the form of an inverted Y the single leg of which is aligned with said flange aperture and a cotter key for securing said pin within said pulley insertable through said flange opening into the aligned leg of said bore, said cotter key being spread by the divergent legs of said bore to extend beyond the wall of said flange opening.

4. In combination a shaft, a pulley mounted on said shaft and having a peripheral flange and an inwardly extending hub, said hub and shaft being provided with aligned apertures there being also an aligned opening in said flange, a pin insertable through said flange opening and loosely mounted in said shaft and hub apertures, said pin being of less length than the internal diameter of said pulley, and being provided at one end with a bore having a portion aligned with said opening, securing means for said pin insertable through said opening into the aligned portion of said bore and diverted laterally to extend beyond the wall of said flange opening, said diverted portion of the bore being so constructed that the extremity of said securing means extending therefrom will be at such distance from the end of the pin as to prevent the excursion of said end beyond the peripheral surface of said pulley.

5. In combination a shaft, a pulley mounted on said shaft and having a peripheral flange and an inwardly extending hub, said hub and shaft being provided with aligned apertures there being also an aligned opening in said flange, a pin insertable through said flange opening and loosely mounted in said shaft and hub apertures, said pin being of less length than the diameter of said pulley, and being provided at one end with a bore having a portion aligned with said opening, securing means for said pin insertable through said flange opening into the aligned portion of said bore and diverted laterally to extend beyond the wall of said flange opening said diverted portion of the pin opening being so constructed that the extremity of said securing means extending therefrom will be at such distance from the end of the pin as to prevent the excursion of said end beyond the peripheral surface of said pulley, and said pin being of such a length as to maintain the extremity of said securing means without the zone of engagement of a crank dog with said pin.

6. In combination with a shaft and an inwardly hubbed pulley having a peripheral flange, said shaft and the hubbed portion of said pulley being provided with aligned apertures for the reception of a securing pin and said flange having an opening for the insertion of the pin, a pin inserted through said aligned hub and shaft apertures and means provided with projecting securing elements, for removing said pin by a radial pull through said flange opening, said removing means being constructed to successively draw said pin until the securing elements engage the inner surface of said flange, to retract said securing elements within said pin and to withdraw said pin through said opening.

7. A pin for radial insertion into and withdrawal through an opening in the flange of a fan pulley, comprising an unthreaded member of uniform diameter having a cotter key-way in one end comprising a bore having the form of an inverted Y, the single leg of which is substantially axial of the member, a cotter key insertable in the single leg of said bore and spread by passage through said divergent legs, the spread extremities of said cotter key being adapted to limit the radial movement of said pin when in position within the flange of the pulley.

In testimony whereof I have hereunto set my hand in presence of two subscribing witnesses.

CLARENCE L. RUFFCORN.

Witnesses:
  C. J. SOUTHARD,
  W. I. SOUTHARD.